United States Patent [19]
Shimizu et al.

[11] Patent Number: 5,777,191
[45] Date of Patent: Jul. 7, 1998

[54] WET OXIDIZING PROCESS OF WASTE SODA

[75] Inventors: Isoo Shimizu; Jun-ichi Kohhashi, both of Yokohama, Japan

[73] Assignee: Nippon Petrochemicals Company, Limited, Tokyo, Japan

[21] Appl. No.: 789,388

[22] Filed: Jan. 28, 1997

[30] Foreign Application Priority Data

Jan. 31, 1996 [JP] Japan ................... 8-038863

[51] Int. Cl.⁶ .................. A62D 3/00; C02F 1/74
[52] U.S. Cl. ................ 588/205; 210/761; 210/762; 210/928; 423/DIG. 11
[58] Field of Search .......... 423/DIG. 11; 210/761, 210/762, 928; 588/205

[56] References Cited

U.S. PATENT DOCUMENTS

| | | | |
|---|---|---|---|
| 2,261,921 | 11/1941 | Pittman et al. | 210/2 |
| 3,186,942 | 6/1965 | Benger et al. | 210/63 |
| 3,761,409 | 9/1973 | McCoy et al. | 210/63 |
| 4,070,281 | 1/1978 | Tagashira et al. | 210/664 |
| 4,094,780 | 6/1978 | Iwai et al. | 210/38 B |
| 4,155,848 | 5/1979 | Sato et al. | 210/60 |
| 4,350,599 | 9/1982 | Chowdhury | 210/761 |
| 4,399,111 | 8/1983 | Baur et al. | 423/226 |
| 4,756,837 | 7/1988 | Nadezhdin | 210/761 |
| 4,767,543 | 8/1988 | Chornet et al. | 210/761 |
| 4,795,568 | 1/1989 | Chen | 210/761 |
| 5,082,571 | 1/1992 | Beula et al. | 210/739 |
| 5,389,264 | 2/1995 | Lehmann et al. | 210/761 |
| 5,460,732 | 10/1995 | Momont | 210/739 |

FOREIGN PATENT DOCUMENTS

| | | |
|---|---|---|
| 0 513 454 A1 | 11/1992 | European Pat. Off. . |
| 47-44956 | 11/1972 | Japan . |
| 49-54269 | 5/1974 | Japan . |
| 49-33845 | 9/1974 | Japan . |
| 51-79961 | 7/1976 | Japan . |
| 52-150778 | 12/1977 | Japan . |
| 53-19480 | 6/1978 | Japan . |
| 54-108462 | 8/1979 | Japan . |
| 55-41158 | 10/1980 | Japan . |
| 4-338285 | 11/1992 | Japan . |
| 6-277682 | 10/1994 | Japan . |
| 7-979 | 1/1995 | Japan . |
| 2 043 045 A | 10/1980 | United Kingdom . |

OTHER PUBLICATIONS

McCoy., J.W., "Chemical Analysis of Industrial Water", Chemical Publishing Co., New York, 1969, pp. 125–153.

"Manual on Disposal of Refinery Wastes, vol. on Liquid Wastes," Chapter 11–Oxidation; American Petroleum Institute, 1969, pp. 11–3 through 11–9.

*Primary Examiner*—Gary P. Straub
*Attorney, Agent, or Firm*—Fisher, Christen & Sabol

[57] ABSTRACT

A wet oxidizing process for waste soda to attain stable cooling and complete gas-liquid separation of waste soda which is discharged from a wet oxidation reactor for alkali waste liquid, and which process comprises the steps of (1) and (2) and optionally any one of steps (3) to (5), wherein (1) a wet oxidation step in which the alkali waste liquid is brought into contact with excess molecular oxygen, said alkali waste liquid being obtained by bringing an aqueous alkali into contact with a hydrocarbon fluid containing acidic substances of hydrogen sulfide and carbon dioxide, (2) a reducing step to reduce the pressure of a mixture of the oxidized alkali waste liquid from said wet oxidation step and a surplus gas, (3) a separation step to separate said mixture into a gas phase and a liquid phase in a gas-liquid separation tank, (4) a cooling step to cool the separated liquid phase and (5) another cooling step to cool the separated gas phase.

11 Claims, 1 Drawing Sheet

WET OXIDIZING PROCESS OF WASTE SODA

BACKGROUND OF THE INVENTION

(1) Field of the Invention

The present invention relates to a wet oxidizing process of a waste liquid, the so-called waste soda. When light hydrocarbons containing sulfur components such as naphtha, butane and ethane are thermally cracked, sulfur compounds are contained in the obtained hydrocarbon fluid of ethylene and propylene. The sulfur content of this hydrocarbon fluid is removed by absorption using an aqueous alkali and the aqueous alkali after the absorption is discharged as the waste soda.

(2) Description of Prior Art

When hydrocarbons containing sulfur components are subjected to thermal cracking, catalytic cracking or catalytic reforming, the sulfur contents are converted into hydrogen sulfide. Because hydrogen sulfide has undesirable actions such as catalyst poison in the subsequent purification step, it is required to remove such hydrogen sulfide.

In an industrial removing method, an aqueous alkali is brought into contact so as to remove by absorption of the hydrogen sulfide. The aqueous alkali waste discharged from the washing operation by the use of an aqueous alkali is usually called "waste soda" which has strong noxious smell due to absorbed hydrogen sulfide and exhibits also a high value in COD (chemical oxygen demand). In view of the antipollution, it is necessary to propose a new method for eliminating the bad smell and lowering the COD value.

Among the proposed various methods for excluding the undesirable effects of the above described aqueous alkali waste, a process for oxidizing by making contact with molecular oxygen under the condition where water can exist in liquid phase, i.e., a wet oxidizing process is considered to be desirable in view of industrial practice. In this respect, a variety of methods and apparatus have heretofore been proposed.

In general, wet oxidation is carried out at a high temperature of 150° C. or above which is far higher than the boiling point of water, and it is operated under a pressure of 20 atm or higher in order to maintain water in liquid phase at this temperature. Accordingly, it is an important factor for stable and long term operation of wet oxidation system that the oxidized alkali waste liquid which is discharged from a reactor at a high temperature and high pressure, is cooled stably and gas and liquid are separated.

However, in the alkali waste liquid to be supplied to the wet oxidation system, sodium carbonate absorbed in the aqueous alkali and the sodium sulfide as the major substance to be oxidized are contained in addition to a trace amount of organic substances. So that, the alkali waste liquid which is oxidized by the wet oxidizing treatment contains a slight amount of organic substances as well as inorganic substances such as sodium carbonate, sodium sulfide and excess caustic soda.

Therefore, sludge or the like is liable to be produced in cooling operation for the oxidized alkali waste liquid and in the operation of gas-liquid separation. In an extreme occasion, the piping is clogged.

In this respect, a variety of methods have heretofore been proposed, however, there is no method for solving the problem satisfactorily. For instance, as proposed in Japanese Patent Laid-open Publication No. 6-277682 that an alkali waste liquid oxidized at a high temperature and under high pressure is directly mixed with another alkali waste liquid of a low temperature so as to effect heat exchange, whereby the former alkali waste liquid is cooled, it is impossible to realize a long term stable operation because of clogging of the heat exchanger is caused to occur.

For example, a method for suppressing the generation of sludge by causing air to coexist in an alkali waste liquid, is proposed in Japanese Patent Laid-open Publication No. 49-54269. It is difficult to suppress sufficiently the formation of sludge in a heat exchanger if this method is applied to the alkali waste liquid obtained from a thermal cracking step for petroleum as in the present invention.

Furthermore, because the oxidized alkali waste liquid contains a large amount of inorganic salts and caustic soda as described above, if the gas-liquid separation after wet oxidation is insufficient, it is liable to occur that caustic soda exhibiting strong alkalinity is entrained into the separated gas.

Therefore, the proposal of an improved process for carrying out stable cooling and complete gas-liquid separation for a fluid discharged from a wet oxidation reactor is desired.

OBJECT AND SUMMARY OF THE INVENTION

In view of the above circumstances, an object of the present invention is to provide a wet oxidizing process to attain stable cooling and complete gas-liquid separation of a fluid discharged from a wet oxidation reactor for alkali waste liquid.

More specifically, the first aspect of the present invention relates to a wet oxidizing process of waste soda, which is characterized by the steps of:

(1) a wet oxidation step in which an alkali waste liquid is brought into contact with excess molecular oxygen so as to oxidize the alkali waste liquid under high temperature and high pressure conditions in which the alkali waste liquid can exist in liquid phase. The alkali waste liquid is the one which is obtained by bringing an aqueous alkali into contact with a hydrocarbon fluid containing acidic substances mainly comprising hydrogen sulfide and carbon dioxide so as to absorb the acidic substances; and (2) a step to reduce the pressure of the mixture of the oxidized alkali waste liquid discharged from the above wet oxidation step and a surplus gas, by means of a pressure reducing valve to a value in the range from 0.1 atm to 5 atm.

The second aspect of this invention relates to a wet oxidizing process of waste soda which is characterized by the following steps of (1), (2) and (3):

(1) a wet oxidation step in which an alkali waste liquid is brought into contact with excess molecular oxygen so as to oxidize the alkali waste liquid under high temperature and high pressure conditions in which the alkali waste liquid can exist in liquid phase. The alkali waste liquid is the one which is obtained by bringing an aqueous alkali into contact with a hydrocarbon fluid containing acidic substances mainly comprising hydrogen sulfide and carbon dioxide so as to absorb the acidic substances;

(2) a step to reduce the pressure of the mixture of the oxidized alkali waste liquid discharged from the above wet oxidation step and a surplus gas, by means of a pressure reducing valve to a value in the range from 0.1 atm to 5 atm; and (3) a step to separate the above mixture of the oxidized alkali waste liquid and the surplus gas into a gas phase portion and a liquid phase portion in a gas-liquid separation tank after reducing the pressure.

The third aspect of this invention relates to a wet oxidizing process of waste soda which is characterized by the following steps of (1), (2), (3) and (4):

(1) a wet oxidation step in which an alkali waste liquid is brought into contact with excess molecular oxygen so as to oxidize the alkali waste liquid under high temperature and high pressure conditions in which the alkali waste liquid can exist in liquid phase. The alkali waste liquid is the one which is obtained by bringing an aqueous alkali into contact with a hydrocarbon fluid containing acidic substances mainly comprising hydrogen sulfide and carbon dioxide so as to absorb the acidic substances;

(2) a step to reduce the pressure of the mixture of the oxidized alkali waste liquid discharged from the above wet oxidation step and a surplus gas, by means of a pressure reducing valve to a value in the range from 0.1 atm to 5 atm;

(3) a step to separate the above mixture of the oxidized alkali waste liquid and the surplus gas into a gas phase portion and a liquid phase portion in a gas-liquid separation tank after reducing the pressure; and (4) a cooling step in which at least a part of the separated liquid phase is cooled to a temperature in the range from 10° C. to 80° C.

The fourth aspect of the invention relates to a wet oxidizing process of waste soda which is characterized by the following steps (1), (3), (4) and (5):

(1) a wet oxidation step in which an alkali waste liquid is brought into contact with excess molecular oxygen so as to oxidize the alkali waste liquid under high temperature and high pressure conditions in which the alkali waste liquid can exist in liquid phase. The alkali waste liquid is the one which is obtained by bringing an aqueous alkali into contact with a hydrocarbon fluid containing acidic substances mainly comprising hydrogen sulfide and carbon dioxide so as to absorb the acidic substances;

(3) a step to separate the above mixture of the oxidized alkali waste liquid and the surplus gas into a gas phase portion and a liquid phase portion in a gas-liquid separation tank;

(4) a cooling step in which at least a part of the separated liquid phase is cooled to a temperature in the range from 10° C. to 80° C.; and (5) another cooling step in which at least a part of said cooled liquid phase is brought into gas-liquid contact with the gas phase which was separated in said step (3) so as to cool the foregoing gas phase.

The fifth aspect of this invention relates to a wet oxidizing process of waste soda which is characterized by the following steps (1), (2), (3), (4) and (5):

(1) a wet oxidation step in which an alkali waste liquid is brought into contact with excess molecular oxygen so as to oxidize the alkali waste liquid under high temperature and high pressure conditions in which the alkali waste liquid can exist in liquid phase. The alkali waste liquid is the one which is obtained by bringing an aqueous alkali into contact with a hydrocarbon fluid containing acidic substances mainly comprising hydrogen sulfide and carbon dioxide so as to absorb the acidic substances;

(2) a step to reduce the pressure of the mixture of the oxidized alkali waste liquid discharged from the above wet oxidation step and a surplus gas, by means of a pressure reducing valve to a value in the range from 0.1 atm to 5 atm;

(3) a step to separate the above mixture of the oxidized alkali waste liquid and the surplus gas into a gas phase portion and a liquid phase portion in a gas-liquid separation tank after reducing the pressure;

(4) a cooling step in which at least a part of the separated liquid phase is cooled to a temperature in the range from 10° C. to 80° C.; and (5) another cooling step in which at least a part of said cooled liquid phase is brought into gas-liquid contact with the gas phase which was separated in said step (3) so as to cool the foregoing gas phase.

The sixth aspect of this invention relates to a wet oxidizing process of waste soda which is characterized by the following steps (1), (2), (3), (4) and (5'):

(1) a wet oxidation step in which an alkali waste liquid is brought into contact with excess molecular oxygen so as to oxidize the alkali waste liquid under high temperature and high pressure conditions in which the alkali waste liquid can exist in liquid phase. The alkali waste liquid is the one which is obtained by bringing an aqueous alkali into contact with a hydrocarbon fluid containing acidic substances mainly comprising hydrogen sulfide and carbon dioxide so as to absorb the acidic substances;

(2) a step to reduce the pressure of the mixture of the oxidized alkali waste liquid discharged from the above wet oxidation step and a surplus gas, by means of a pressure reducing valve to a value in the range from 0.1 atm to 5 atm;

(3) a step to separate the above mixture of the oxidized alkali waste liquid and the surplus gas into a gas phase portion and a liquid phase portion in a gas-liquid separation tank after reducing the pressure;

(4) a cooling step in which at least a part of the separated liquid phase is cooled to a temperature in the range from 10° C. to 80° C.; and (5') another cooling step in which at least a part of said cooled liquid phase is recycled into said gas-liquid separation tank and, in the same tank, it is brought into gas-liquid contact with the gas phase which was separated in said step (3) so as to cool the foregoing gas phase.

The present invention will be described in more detail in the following.

Step (1):

The "hydrocarbon fluid containing acidic substances mainly composed of hydrogen sulfide and carbon dioxide" means a fluid in a liquid phase, a gas phase or a mixed phase of them. It is exemplified by the gas such as ethylene which is obtained from the thermal cracking or catalytic cracking for producing olefins such as ethylene and propylene from the light hydrocarbons such as naphtha, butane and ethane containing sulfur contents. The above light hydrocarbon contains sulfur, oxygen and the like. When these elements are thermally cracked, hydrogen sulfide and carbon dioxide are produced, and they are contained in the cracked gases. The hydrocarbon fluid preferred in the present invention contains hydrogen sulfide and carbon dioxide as the main acidic substances.

In the purification of an olefin gas such as ethylene, it is subjected to a hydrogenation process for removing highly unsaturated hydrocarbons such as acetylene. In this process, the hydrogen sulfide existing in the olefin gas sometimes acts as a catalyst poison relative to the dehydrogenating catalyst. In order to remove the hydrogen sulfide as a catalyst poison, the olefin gas is washed with an aqueous alkali in a scrubber and the hydrogen sulfide is absorbed into the aqueous alkali. In this procedure, the acidic substance such as carbon dioxide in the olefin gas is simultaneously absorbed into the aqueous alkali.

In general, alkalis such as caustic soda, caustic potash and ammonia are used for a wash water of the scrubber. Among them, an aqueous solution of strong base such as caustic soda is preferably employed.

With regard to the following steps, the present invention will be described by way of an example on an alkali waste liquid produced by washing the gas with an aqueous caustic soda.

In the alkali waste liquid which absorbed hydrogen sulfide as described above, the sulfur content exists as sodium sulfide and sodium hydrosulfide with maintaining their equilibrium relationship. Sodium thiosulfate is not substantially detected generally. The carbon dioxide which is absorbed as an acidic substance exists substantially in the form of sodium carbonate, but it does not exist in the form of sodium bicarbonate.

Because the alkali waste liquid from the scrubber sometimes contains a small quantity of oily hydrocarbons, a pretreatment of separation by extraction is usually carried out before serving the alkali waste liquid for the wet oxidizing process. The oily hydrocarbons are removed to such a degree that the wet oxidation is not influenced substantially. It is, however, difficult to remove completely a slight amount of organic substances.

Furthermore, concerning the alkali waste liquid after the absorption of acidic substances, it is preferred to adjust the concentration of caustic soda in the aqueous alkali. That is, in order to prevent the releasing of hydrogen sulfide, it is preferable that 0.1% or more of caustic soda may remain to maintain the alkalinity when the alkali waste liquid is discharged from the scrubber.

In the wet oxidizing process according to the above Step (1), a gas containing a molecular oxygen such as oxygen or air is brought into contact with an aqueous solution containing sulfides such as the foregoing alkali waste liquid under a condition that a liquid phase is maintained under high temperature and high pressure conditions, thereby oxidizing the sulfide into sodium sulfate.

The reaction temperature is within a range of from 150° to 350° C., and preferably from 150° to 230° C. When the reaction temperature is in this range, sodium sulfide is sufficiently oxidized to produce sodium sulfate.

The pressure may be on the level that the alkali waste liquid can maintain a liquid phase within the above described temperature range. The pressure can be arbitrarily selected from a range generally from 15 to 100 atm.

As the molecular oxygen which is brought into contact with the feed material of alkali waste liquid, oxygen gas, air or the mixed gas of them is used. The oxygen gas and a mixture of air and oxygen are preferable. Concerning the amount of oxygen, an amount in excess of the theoretical amount of molecular oxygen which is required for oxidation is supplied. Accordingly, a surplus quantity of gas is entrained into the liquid discharged from the wet oxidizing step, not only in air oxidation but also in the use of pure oxygen.

The structure of the oxidation reactor is not especially limited but any well-known conventional reactor for wet oxidation can be employed. For instance, a double cylindrical type reactor in which an oxygen-containing gas is introduced from the lower part of the cylindrical type reactor into the inside of an inner cylinder, and liquid circulation from the inside to the outside (the space between outer cylinder and inner cylinder) of the inner cylinder is conducted by utilizing the flow of the gas stream going up inside the inner cylinder as described in Japanese Patent Publication No. 55-41158 is particularly suitable for use in the process of the present invention.

When a heat exchanger for exchanging indirectly the heat between an alkali waste liquid and the oxidized alkali waste liquid is disposed before or after the wet oxidation reactor, the heat generated in the oxidation reaction can be recovered.

The oxidized alkali waste liquid treated in the wet oxidizing step as mentioned above flows out from the reactor together with an excess gas such as air. This oxidized alkali waste liquid contains caustic soda, sodium carbonate, sodium sulfate and a slight amount of organic substances.

Step (2):

In a preferred process according to the present invention, the pressure of the fluid of a high temperature and a high pressure which is discharged from the reactor in a state of a mixture of the above described oxidized alkali waste liquid and a gas such as air, is lowered by way of a pressure reducing valve to a value in the range from 0.1 atm to 5 atm. Any of well-known conventional pressure reducing mechanism may be employed if it can reduce the pressure of the fluid discharged from the reactor and having a high temperature and a high pressure, to a prescribed pressure. Usually, a pressure reducing valve having a simple mechanism such as an orifice valve is employed. In this case, for instance, it is possible to employ a conventional method in which a pressure gauge is disposed on the downstream side of the adjustable orifice valve so as to control the valve.

As a result of the reduction of pressure, a part of water content in a liquid phase in the mixture is evaporated, so that due to the latent heat of evaporation, the temperature of the fluid is lowered usually to a range from about 100° C. to about 130° C. according to the reducing degree of pressure. When the pressure is reduced to a value ranging from 0.1 atm to 5 atm, inorganic alkali components which are finely dispersed are not entrained in the gas, so that the alkali components can be removed completely from the gas as a result of a combined working of the succeeding gas-liquid contact in a gas-liquid separation tank. Furthermore, when the degree of pressure reduction is within the above range, the cooling effect due to the absorption of latent heat by evaporation is also sufficient.

In this step (2), constant cooling is stably carried out. In other words, it can be carried out without accompanying the formation of sludge or the like by means of the convenient measure to employ a pressure reducing valve. Further, even when sludge is formed, it is possible to effect stable cooling.

It is to be noted that this Step (2) of reducing pressure can be omitted if the pressure and the like in Step (1) are appropriate or depending upon the mechanism of the gas-liquid separation tank in the succeeding Step (3).

Step (3):

Subsequent to Step (2), the cooled and pressure-reduced mixed fluid is introduced into a gas-liquid separation tank to separate the same into a gas and the oxidized alkali waste liquid. Because the pressure of the mixed fluid is lowered, the gas-liquid separation in this step is carried out easily, so that any well-known conventional means can be employed as the gas-liquid separation tank. The gas and the liquid after the gas-liquid separation can be discharged outside the system. If necessary, it is subjected to post-treatment such as neutralization before discharging.

As a gas-liquid separation tank used in the present Step (3), while any means having a gas-liquid separating function can be used as described above, preferable one is a device having a function to perform sufficient gas-liquid contact in addition to the gas-liquid separating function. More particularly, it is exemplified by a vertical vessel which allows the passage of a mixed fluid and filled with Raschig rings or the like so as to improve the efficiency of gas-liquid contact or an apparatus in which a single or a plurality of porous plates or trays are disposed in it. In addition to the above examples, a horizontal separation tank of a type in which revolving flows are utilized can also be employed.

The mixed fluid which was cooled and the pressure of which was reduced, is preferably introduced into the middle part of a gas-liquid separation tank when a vertical separation tank is used. Meanwhile, if a horizontal separation tank is used, the mixed fluid is introduced into an optional portion of the separation tank. The oxidized alkali waste liquid is discharged as a separated liquid phase from the lower part of the separation tank and a surplus gas is discharged from the upper part of the separation tank as the separated gas phase.

However, the separated gas is preferably discharged after the gas-liquid contact with the cooled oxidized alkali waste liquid as described in the following Step (5). While, although the separated waste liquid is suitably cooled and discharged from the system, it is preferably recycled and used for gas-liquid contact with the separated gas phase and then discharged as described in the Step (5).

The gas phase and the liquid phase obtained by the gas-liquid separation can be discharged from the system by means of any suitable discharging means.

Step (4):

At least a part of the oxidized alkali waste liquid which was separated as a liquid phase by the above described gas-liquid separation tank is then cooled. The other part of the oxidized alkali waste liquid is discharged from the system as it stands when the temperature of the alkali waste liquid is appropriate. When the temperature of the alkali waste liquid is high, it is appropriately diluted with low temperature water and then it is discharged from the system.

In order to cool at least a part of the oxidized alkali waste liquid, a suitable heat exchanger can be used. For instance, a shell-and-tube heat exchanger which cools by means of industrial water, can be adopted. A cooling temperature may be selected within a range of 10° C. to 80° C. When the alkali waste liquid is cooled to a temperature below 10° C., inorganic salts contained in the alkali waste liquid separate out, and in an extreme case, there is an apprehension in losing operation stability because blocking of pipings may caused to occur. On the other hand, when the cooling is stopped at a temperature above 80° C., there is an apprehension of the lowering in cooling effect when the cooled alkali waste liquid is used for the cooling of the separated gas phase in Step (5).

Furthermore, because the temperature of oxidized alkali waste liquid is lowered to a certain level by reducing its pressure with a pressure reducing valve in the above described Step (2), the load on the cooling in this step is low and the stable cooling operation can be done.

Step (5):

When the oxidized alkali waste liquid which was cooled in the above described Step (4) is brought into gas-liquid contact with the gas separated in a gas-liquid separation tank, the gas is cooled. At the same time, if caustic soda of strong alkalinity is entrained in the gas, it is extracted and removed from the gas.

The apparatus used herein for the gas-liquid contact can be installed additionally to the above described gas-liquid separation tank. Any well-known conventional means can be employed so far as it is provided with a gas-liquid contact mechanism.

However, when the above-mentioned gas-liquid separation tank has a gas-liquid contact function for gas and liquid in addition to the function of gas-liquid separation, it is preferable that the oxidized alkali waste liquid which was cooled in the above Step (4) is recycled into this gas-liquid separation tank. In this case, for example, in the upper part of the gas-liquid separation tank, the recycled oxidized alkali waste liquid is brought into gas-liquid contact with the gas which was separated by the gas-liquid separation tank. After the gas-liquid contact in the gas-liquid separation tank, the oxidized alkali waste liquid is passed to the lower part of the gas-liquid separation tank when a vertical tank is used, and this alkali waste liquid is combined with the oxidized alkali waste liquid which was separated in the Step (3) and the mixture is discharged from the lower part of the gas-liquid separation tank. Furthermore, the gas after the gas-liquid contact is discharged from the upper part of the same separation tank.

When a gas-liquid contact tank is installed separately for the gas-liquid contact, the liquid after cooling the gas is supplied to the upper part of the above gas-liquid separation tank, or the liquid is combined with another liquid separated in the gas-liquid separation tank to discharge the same, or the former liquid is discharged from the system as it stands.

The quantity of the cooled oxidized alkali waste liquid which is used for cooling the separated gas is suitably determined depending upon the amount and temperature of the separated surplus gas, the cooling temperature of the waste liquid. In general, however, the amount of the alkali waste liquid is selected within a range of 0.01 to 50 times by weight as much as one weight part of oxidized waste liquid after the wet-oxidation which is introduced into the gas-liquid separation tank.

In place of gas-liquid contact with the cooled oxidized alkali waste liquid, when the gas-liquid contact is carried out using cooling water supplied from the outside, e.g., industrial water, slight amounts of the calcium and magnesium contents in the cooling water react with sodium carbonate or the like contained in the oxidized alkali waste liquid to produce insoluble sludge, and in an extreme case, the sludge clogs the gas-liquid separation tank and piping, resulting in the hindrance of a stable operation for a long period of time, so that the cost for the wet oxidation is increased seriously. Therefore, the use of industrial water or the like is not desirable. In order to avoid the formation of sludge, it is necessary to use ion-exchanged water or pure water containing no metallic ion.

In the Step (5), the surplus gas is cooled to a degree that the discharging of the surplus gas from the system is possible. Besides, when alkali substances and the like are entrained in the surplus gas, it is also possible to remove them.

BRIEF DESCRIPTION OF THE DRAWING

The present invention will become more fully understood from the detailed description given hereinafter and the accompanying drawing which are given by way of illustration only, and thus is not limitative of the present invention, and wherein.

DETAILED DESCRIPTION OF THE INVENTION

Figure 1:
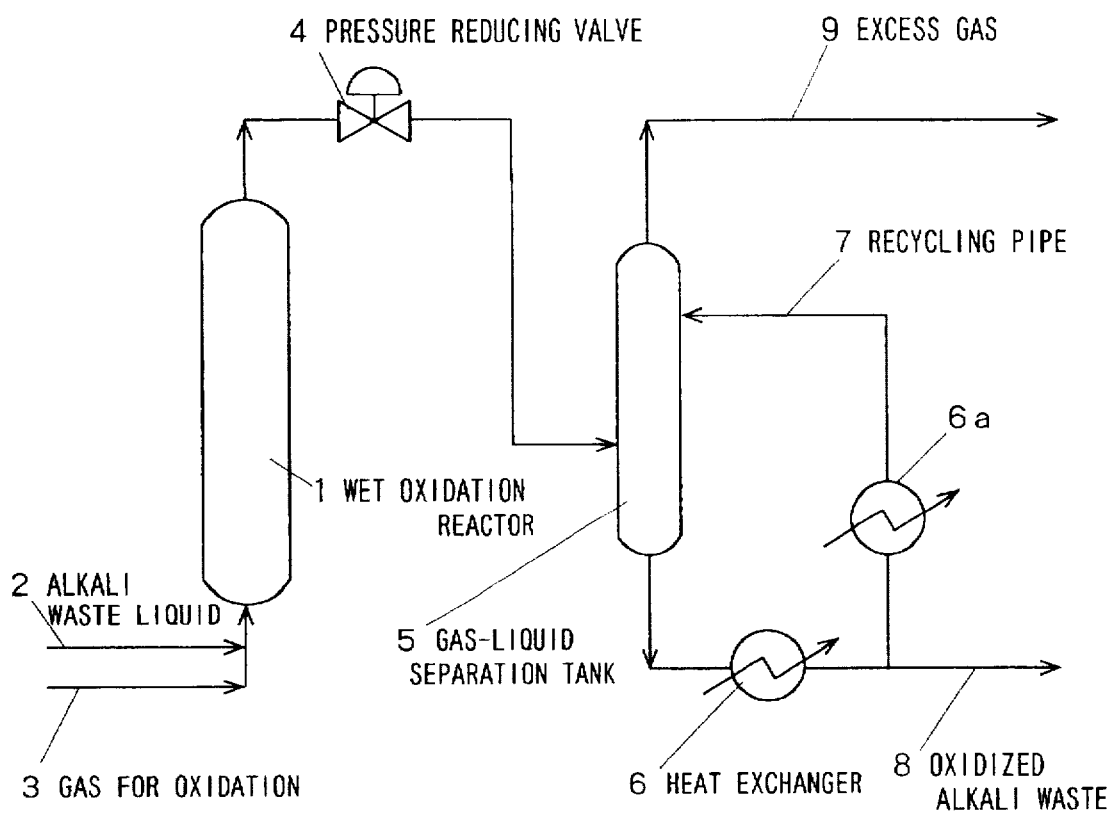
FIG. 1 is a schematic flow sheet illustrating an example of the steps in the wet oxidizing process according to the present invention.

Referring to FIG. 1, an alkali waste liquid 2 and a gas 3 for oxidation is fed from the lower part of a wet oxidation reactor 1. The alkali waste liquid 2 is the one which is discharged from a washing tower (not shown). From the upper part of the wet oxidation reactor 1, a mixed phase fluid composed of an oxidized alkali waste liquid and a surplus gas is discharged.

The pressure of the mixed phase fluid of the oxidized alkali waste liquid and the surplus gas is reduced by means of a pressure reduction valve 4 which is composed of an orifice valve.

The mixed phase fluid the pressure of which was thus reduced, is then introduced into the middle stage of, for example, a flow-down type vertical gas-liquid separation tank 5. In the gas-liquid separation tank 5, the introduced mixed phase fluid is separated into two phases, i.e., a gas phase and a liquid phase. The liquid phase is discharged from the lower part of the gas-liquid separation tank 5 and the gas phase is discharged from the upper part thereof. The gas-liquid separation tank 5 is not limited to the one having the above described structure so far as it has a function to allow the separated gas phase into gas-liquid contact with the recycled water (the oxidized alkali waste liquid).

The liquid phase discharged from the lower part of the gas-liquid separation tank 5 is cooled by means of a heat exchanger 6, and it is then discharged from the system.

Furthermore, a part of the liquid phase cooled by the heat exchanger 6 is supplied to the upper part of the gas-liquid separation tank 5 through a recycling piping 7, and it is subjected to gas-liquid contact with the gas phase which was previously supplied into the middle stage of the gas-liquid separation tank to be separated and flowing upwards in the tank. Thus, the gas phase is cooled. The recycled waste liquid which cools the gas phase flows down in the separation tank and is combined with the liquid phase which is supplied into the middle stage of the tank, and it is discharged from the lower part of the gas-liquid separation tank 5 as an oxidized alkali waste liquid. On the other hand, the cooled gas phase is discharged as a surplus gas 9.

Furthermore, the position of the heat exchanger 6 is not limited to the location shown in FIG. 1. In the case that the quantity of recycling is large, a heat exchanger as represented by a reference numeral 6a can be installed in the course of the recycling piping 7, or heat exchangers may be disposed at both the positions indicated by reference numerals 6 and 6a.

DETAILED DESCRIPTION OF THE PREFERRED EMBODIMENTS

The present invention will be described in more detail in conjunction with examples and comparative examples.

<EXAMPLE 1>

The waste liquid obtained from a soda washing tower for removing sulfur contents in the gas fractions produced from a naphtha cracker was used. A wet oxidizing treatment was carried out at a temperature of 185° C. under a pressure of 29 atm by using a double-pipe wet oxidizing apparatus which is composed of an outer cylinder (60 cm in diameter, 4 m in height) and an inner cylinder (45 cm in diameter, 3.5 m in height). The outline of the process was as shown in FIG. 1 except that the heat exchanger 6a was not used.

The above described double pipe wet oxidizing device as a wet oxidizing reactor 1 has the structure disclosed in the above-mentioned Japanese Patent Publication No. 55-41158. An oxygen-containing gas is introduced from the lower part of a cylindrical reactor into the interior of an inner cylinder. The liquid circulation from the inside of the inner cylinder to the outside thereof (the space between the inner cylinder and the outer cylinder) can be carried out by utilizing the flow of gas stream going up in the inner cylinder.

As a result of wet oxidation, the remaining $S^-$ ion of the oxidized alkali waste liquid was 6 ppm and the pH was 11.9. The composition of the oxidized alkali waste liquid was 3.0% by weight of sodium carbonate, 4.7% by weight of sodium sulfate and 0.8% by weight of caustic soda.

The pressure of the mixture of the above described oxidized alkali waste liquid and surplus air was reduced by means of the pressure reducing valve 4 to 2 atm, and the mixture cooled by the pressure reduction was introduced over a first stage tray in a down-flow type vertical gas-liquid separation tank 5 (1 m in diameter and 2 m in height) of three stage trays.

The oxidized alkali waste liquid which was separated in the above described gas-liquid separation tank and discharged from the lower part thereof, was cooled to 45° C. by means of a heat exchanger 6 in which industrial water is used. While the air separated in the separation tank was discharged from the upper part of the gas-liquid separation tank 5 as the surplus gas 9.

Furthermore, the above described waste liquid which was cooled to 45° C., was recycled to the upper part of the separation tank through the recycling piping 7 to allow the waste liquid into gas-liquid contact with the surplus air separated in the gas-liquid separation tank 5, thereby cooling the surplus air. An amount of the surplus air to be recycled was 2.5 times by weight as much as the oxidized alkali waste liquid to be introduced from the reactor to the gas-liquid separation tank. The recycled waste liquid was combined with another waste liquid in the lower part of the separation tank and they were discharged.

Operation of the above described system was stable even after the lapse of 6 weeks from the start of operation and no formation of scales was observed in any of the reactor, separation tank and piping through which the fluid was passed.

<COMPARATIVE EXAMPLE 1>

Wet oxidation was carried out in the like manner as in Example 1 except that the waste liquid from the lower part of the separation tank was cooled to 45° C. and it was then discharged intact without recycling. The cooling for the surplus gas 9 was carried out by supplying sea-water of 45° C. to the upper part of the separation tank in place of the recycling of waste liquid.

During the operation of the above described system, minute white particles of scale began to appear in the fluid discharged from the lower part of the separation tank after the lapse of about 2 weeks from the starting of operation. When the inside of the separation tank was inspected after 3 weeks from the starting of operation, white scale was deposited on each tray and some openings of trays were clogged.

<COMPARATIVE EXAMPLE 2>

Wet oxidation was carried out in the like manner as in Comparative Example 1 except that industrial water was used in place of the sea-water in Comparative Example 1.

As a result, minute white particles of scale began to appear in the fluid which was discharged from the lower part of the separation tank after about 10 days from the start of operation. When the inside of the separation tank was inspected after 20 days from the start of operation, white scale was deposited on the trays and some openings of trays were clogged.

According to the present invention, it is possible to attain the advantages that:

(1) By employing a convenient method that a mixture which was treated through wet oxidation in a reactor is cooled and reduced in pressure by means of a pressure reducing valve,the cooling of the mixture can be attained stably, i.e. without producing substantially sludge or the like.

(2) By cooling an oxidized alkali waste liquid and by bringing it into gas-liquid contact with a surplus gas, it is possible to cool the surplus gas and to remove the alkali entrained in the gas.

(3) When a gas-liquid separation tank having a gas-liquid contacting mechanism is employed, the entire system can be simplified by cooling at least a part of the oxidized alkali waste liquid and recycling it into the gas-liquid separation tank.

As described above, according to the process of the present invention, it is possible to attain stable and long term working of the wet oxidation of an alkali waste liquid economically in an industrial scale.

It will be appreciated by those skill in the art that the present invention can be embodied in other specific forms without departing from the characteristics thereof.

The presently disclosed embodiments are therefore considered to be illustrative and not restrictive. The scope of the invention is indicated by the appended claims rather than the foregoing description, and all changes that come within the meaning and range of equivalents thereof are intended to be embraced therein.

What is claimed is:

1. In the wet oxidation of an alkali waste liquid obtained by contacting an aqueous alkali and a hydrocarbon fluid containing acidic substances mainly comprising hydrogen sulfide and carbon dioxide, a process comprising:

bringing an alkali waste liquid into contact with excess molecular oxygen so as to oxidize said alkali waste liquid at a temperature of from 150° C. to 350° C. and at a pressure of from 15 atmospheres to 100 atmospheres under conditions in which said alkali waste liquid can exist in liquid phase, said alkali waste liquid being obtained by contacting an aqueous alkali and a hydrocarbon fluid containing acidic substances mainly comprising hydrogen sulfide and carbon dioxide so as to absorb said acidic substances;

separating said reduced-pressure mixture of the oxidized alkali waste liquid and surplus gas into a gas phase portion and a liquid phase portion in a gas-liquid separation tank;

cooling at least a part of said separated liquid phase to a temperature in the range from 10° C. to 80° C. to form a cooled liquid phase portion; and contacting at least a part of said cooled liquid phase portion with said gas phase portion so as to cool said gas phase portion.

2. A wet oxidizing process for waste liquid as claimed in claim 1 wherein the pressure of the mixture is reduced without substantial cooling of the mixture prior to pressure reduction.

3. In the wet oxidation of an alkali waste liquid obtained by contacting an aqueous alkali and a hydrocarbon fluid containing acidic substances mainly comprising hydrogen sulfide and carbon dioxide, a process comprising:

bringing an alkali waste liquid into contact with excess molecular oxygen so as to oxidize said alkali waste liquid at a temperature of from 150° C. to 350° C. and at a pressure of from 15 atmospheres to 100 atmospheres under conditions in which said alkali waste liquid can exist in liquid phase, said alkali waste liquid being obtained by contacting an aqueous alkali and a hydrocarbon fluid containing acidic substances mainly comprising hydrogen sulfide and carbon dioxide so as to absorb said acidic substances;

reducing the pressure of a mixture of the oxidized alkali waste liquid and surplus gas resulting from the oxidation of said alkali waste liquid, to a value in the range from 0.1 atm to 5 atm by means of a pressure reducing valve;

separating said mixture of the oxidized alkali waste liquid and surplus gas into a gas phase portion and a liquid phase portion in a gas-liquid separation tank after reducing the pressure;

cooling at least a part of said separated liquid phase portion to a temperature in the range from 10° C. to 80° C. to form a cooled liquid phase portion; and contacting at least a part of said cooled liquid phase portion with said gas phase portion so as to cool said gas phase portion.

4. A wet oxidizing process for waste liquid as claimed in claim 3 wherein the pressure of the mixture is reduced without substantial cooling of the mixture prior to pressure reduction.

5. In the wet oxidation of an alkali waste liquid obtained by contacting an aqueous alkali and a hydrocarbon fluid containing acidic substances mainly comprising hydrogen sulfide and carbon dioxide, a process comprising:

bringing an alkali waste liquid into contact with excess molecular oxygen so as to oxidize said alkali waste liquid at a temperature of from 150° C. to 350° C. and at a pressure of from 15 atmospheres to 100 atmospheres under conditions in which said alkali waste liquid can exist in liquid phase, said alkali waste liquid being obtained by contacting an aqueous alkali and a hydrocarbon fluid containing acidic substances mainly comprising hydrogen sulfide and carbon dioxide so as to absorb said acidic substances;

reducing the pressure of a mixture of the oxidized alkali waste liquid and surplus gas resulting from the oxidation of said alkali waste liquid, to a value in the range from 0.1 atm to 5 atm by means of a pressure reducing valve;

separating said mixture of the oxidized alkali waste liquid and surplus gas into a gas phase portion and a liquid phase portion in a gas-liquid separation tank after reducing the pressure;

cooling at least a part of said separated liquid phase to a temperature in the range from 10° C. to 80° C. to form a cooled liquid phase portion; and recycling at least a part of said cooled liquid phase portion into said gas-liquid separation tank and, in the same tank, bringing the at least part of the cooled liquid phase portion into gas-liquid contact with the gas phase portion so as to cool said gas phase portion.

6. A wet oxidizing process for waste liquid as claimed in claim 5 wherein the pressure of the mixture is reduced without substantial cooling of the mixture prior to pressure reduction.

7. In the wet oxidation of an alkali waste liquid obtained by contacting an aqueous alkali and a hydrocarbon fluid containing acidic substances mainly comprising hydrogen sulfide and carbon dioxide, a process comprising:

bringing an alkali waste liquid into contact with excess molecular oxygen so as to oxidize said alkali waste liquid at a temperature of from 150° C. to 350° C. and at a pressure of from 15 atmospheres to 100 atmospheres under conditions in which said alkali waste liquid can exist in liquid phase, said alkali waste liquid being obtained by contacting an aqueous alkali and a hydrocarbon fluid containing acidic substances mainly comprising hydrogen sulfide and carbon dioxide so as to absorb said acidic substances;

reducing the pressure of a mixture of the oxidized alkali waste liquid and surplus gas resulting from the oxidation of said alkali waste liquid, to a value in the range from 0.1 atm to 5 atm by means of a pressure reducing valve;

separating said mixture of the oxidized alkali waste liquid and the surplus gas into a gas phase portion and a liquid phase portion in a gas-liquid separation tank after reducing the pressure; and cooling at least a part of said separated liquid phase portion to a temperature in the range from 10° C. to 80° C. to form a cooled liquid phase portion, wherein said reducing the pressure provides a pressure-reduced mixture having a temperature of from about 100° C. to about 130° C., and said gas phase portion and said liquid phase portion are separated without substantial cooling of the pressure-reduced mixture after pressure reduction and before separation of the gas and liquid phase portions.

8. In the wet oxidation of an alkali waste liquid obtained by contacting an aqueous alkali and a hydrocarbon fluid containing acidic substances mainly comprising hydrogen sulfide and carbon dioxide, a process comprising:

bringing an alkali waste liquid into contact with excess molecular oxygen so as to oxidize said alkali waste liquid at a temperature of from 150° C. to 350° C. and at a pressure of from 15 atmospheres to 100 atmospheres under conditions in which said alkali waste liquid can exist in liquid phase, said alkali waste liquid being obtained by contacting an aqueous alkali and a hydrocarbon fluid containing acidic substances mainly comprising hydrogen sulfide and carbon dioxide so as to absorb said acidic substances; and reducing the pressure of a mixture of the oxidized alkali waste liquid and surplus gas resulting from the oxidation of said alkali waste liquid, by means of a pressure reducing valve without substantially cooling the mixture prior to pressure reduction, so as to avoid the formation of sludge.

9. A process as claimed in claim 8 wherein the temperature of the mixture is lowered as a result of pressure reduction to a range of from about 100° C. to about 130° C.

10. A wet oxidizing process for waste liquid as claimed in claim 6 wherein said mixture of the oxidized alkali waste liquid and the surplus gas is separated into a gas phase portion and a liquid phase portion in a gas-liquid separation tank after reducing the pressure.

11. A wet oxidizing process for waste liquid as claimed in claim 10 wherein said temperature and pressure conditions are a temperature of from 150° C. to 350° C. and a pressure of from 15 atmospheres to 100 atmospheres, and the temperature of the mixture is lowered as a result of pressure reduction to a range of from about 100° C. to about 130° C.

* * * * *